(12) United States Patent
Mons

(10) Patent No.: US 8,085,624 B1
(45) Date of Patent: Dec. 27, 2011

(54) METHOD FOR STORING AUDIO-CENTERED INFORMATION WITH A MULTI-LEVEL TABLE-OF-CONTENTS (TOC) MECHANISM WITH ONE MASTER-TOC AND SUB-TOCS FOR VARIOUS AUDIO FORMATS, A DEVICE FOR USE WITH SUCH MECHANISM AND A UNITARY STORAGE MEDIUM CONTAINING SUCH MECHANISM

(75) Inventor: Johannes J. Mons, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/341,910

(22) PCT Filed: Nov. 24, 1998

(86) PCT No.: PCT/IB98/01868
§ 371 (c)(1),
(2), (4) Date: Jul. 20, 1999

(87) PCT Pub. No.: WO99/28910
PCT Pub. Date: Jun. 10, 1999

(30) Foreign Application Priority Data

Nov. 29, 1997 (EP) .................................... 97203745

(51) Int. Cl.
*G11B 20/12* (2006.01)
(52) U.S. Cl. .................................. 369/30.04; 369/59.25
(58) Field of Classification Search ............... 369/59.25, 369/47.14, 53.17, 30.04, 30.08, 30.09, 275.3
See application file for complete search history.

(56) References Cited

U.S. PATENT DOCUMENTS

| | | | | |
|---|---|---|---|---|
| 4,001,883 A | * | 1/1977 | Strout et al. | |
| 4,996,678 A | * | 2/1991 | Maeda | 369/30.07 |
| 5,200,944 A | * | 4/1993 | Souma | |
| 5,384,674 A | * | 1/1995 | Nishida et al. | 360/72.2 |
| 5,475,668 A | | 12/1995 | Azumatani et al. | |
| 5,596,565 A | * | 1/1997 | Yonemitsu et al. | 369/275.3 |
| 5,623,470 A | * | 4/1997 | Asthana et al. | 369/47.49 |
| 5,734,787 A | * | 3/1998 | Yonemitsu et al. | |
| 5,737,639 A | * | 4/1998 | Ohmori | 710/73 |
| 5,940,853 A | | 8/1999 | Ooi et al. | |
| 6,151,442 A | | 11/2000 | Ueno et al. | |
| 6,298,025 B1 | * | 10/2001 | McPherson et al. | 369/59.21 |
| 6,370,090 B1 | * | 4/2002 | Verbakel et al. | 369/30.04 |

FOREIGN PATENT DOCUMENTS

EP 0402973 A1 12/1990
(Continued)

OTHER PUBLICATIONS

Research Disclosure No. 36411, Aug. 1994, pp. 412-413.

(Continued)

*Primary Examiner* — Adam R Giesy

(57) ABSTRACT

Audio information is stored on a unitary storage medium with a Table-of-Contents (TOC) mechanism for therein specifying an actual configuration of various audio items on the medium. In particular, one or more Sub-TOCs are each assigned to a respective different audio format. A single Master-TOC is provided for specifically pointing to each Sub-TOC.

22 Claims, 4 Drawing Sheets

FOREIGN PATENT DOCUMENTS

| | | | |
|---|---|---|---|
| EP | 0402973 | A1 | 12/1990 |
| EP | 0487331 | A2 | 5/1992 |
| EP | 0613144 | A2 | 8/1994 |
| EP | 0640960 | A2 | 3/1995 |
| EP | 0676761 | A1 | 10/1995 |
| EP | 0709843 | A2 | 5/1996 |
| EP | 0777227 | | 6/1997 |
| EP | 0777227 | A1 | 6/1997 |
| EP | 0817195 | A2 | 1/1998 |
| WO | 95/11508 | * | 4/1995 |
| WO | 9619807 | A2 | 6/1996 |
| WO | 9701156 | A1 | 1/1997 |
| WO | WO97/01156 | | 1/1997 |
| WO | WO97/01303 | | 1/1997 |
| WO | 9816014 | A1 | 4/1998 |
| WO | 9820488 | A2 | 4/1998 |

OTHER PUBLICATIONS

"A Digital Decimating Filter for Analog-to-Digital Conversion of Hi-Fl Audio Signals", by J.J. Van Der Kam in Philips Techn. Rev. 42, No. 6/7, Apr. 1986, pp. 230-238.

"A Higher Order Topology for Interpolative Modulators for Oversampling A/D Converters", by Kirk C.H. Chao et al. in IEEE Trans. on Circuits and Systems, vol. 37, No. 3, Mar. 1990, pp. 309-318.

J.J. Van Der Kam, "A Digital 'Decimating' Filter for Analogo-To-Digirtal Conversion of HI-FI Audio Signals" Philips Tech. Rev. 42, No. 6/7, pp. 230-238, Apr. 1986.

Kirk C.H. Chao et al, "A Higher Order Topology for Interpolative Modulators for Oversampling A/D Converters", IEEE Transactions on Circuits and Systems, vol. 37, No. 3, Mar. 1990, pp. 309-318.

Anonymous, "Variable Transport Speed Recording", Research Disclosure No. 36411, Aug. 1994, pp. 412-413.

* cited by examiner

|  | # bytes | format |
|---|---|---|
| Master_TOC( ) { | | |
|    Master_TOC_0 ( ) | 2048 | Master_TOC_0 |
|    for (c=1; c<=8; c++) | | |
|    { | | |
|       Master_Text [c] | 2048 | Master_Text |
|    } | | |
|    Manuf_Info( ) | 2048 | Manuf_Info |
| } | | |

FIG. 7

|  | # bytes | format | value |
|---|---|---|---|
| Master_TOC_0 ( ) { | | | |
|    M_TOC_0_Header ( ) | 16 | M_TOC_0 Header | |
|    Album_Info ( ) | 48 | Album_Info | |
|    Disc_Info ( ) | 64 | Disc_Info | |
|    Text_Channels ( ) | 40 | Text_Channels | |
|    Reserved | until 2048 | Uint8 | 0 |
| } | | | |

FIG. 8

|  | # bytes | format | value |
|---|---|---|---|
| Disc_Info ( ) { | | | |
|    2CH_TOC_1_Address | 4 | Uint32 | |
|    2CH_TOC_2_Address | 4 | Uint32 | |
|    MC_TOC_1_Address | 4 | Uint32 | |
|    MC_TOC_2_Address | 4 | Uint32 | |
|    Disc_Flags ( ) | 1 | Disc_Flags | |
|    Reserved | 3 | Uint8 | 0 |
|    2CH_TOC_Len | 2 | Uint16 | |
|    MC-TOC_Len | 2 | Uint16 | |
|    Disc_Catalog_Number | 16 | String | |
|    Disc_Genre ( ) | 16 | Genre4 | |
|    Disc_Date | 4 | Date | |
|    Reserved | 4 | Uint8 | 0 |
|    /*** Disc text files are in Master_Text [c] with c=1..8***/ | | | |
| } | | | |

FIG. 9

METHOD FOR STORING AUDIO-CENTERED INFORMATION WITH A MULTI-LEVEL TABLE-OF-CONTENTS (TOC) MECHANISM WITH ONE MASTER-TOC AND SUB-TOCS FOR VARIOUS AUDIO FORMATS, A DEVICE FOR USE WITH SUCH MECHANISM AND A UNITARY STORAGE MEDIUM CONTAINING SUCH MECHANISM

FIELD OF THE INVENTION

The invention relates to the field of digital audio storage on unitary media such as disc or tape. Use of such storage is at present widespread. In case of sub-division of the audio into multiple sub-items, a Table-of-Contents (TOC) allows access to the information in a relatively fast manner. Generally, a TOC specifies at least what has been stored and where it has been stored. However, audio storage is defined according to multiple standardized audio formats, such as two-channel stereo, multiple (5-6) channel audio such as for use in surround sound applications, and possibly others. An audio provider may wish to combine various different such formats on a single medium such as an optical disc, and as a consequence, a user would want to be able to access various audio items in a fast and easy manner.

Those skilled in the art are directed to the following references:

List of Related Documents
(D1) Research Disclosure number 36411. August 1994, page 412-413
(D2) PCT/IB97/01156 (PHN 16.452) 1 bit ADC and lossless compression of audio
(D3) PCT/IB97/01303 (PHN 16.405) Audio compressor
(D4) EP-A 402,973 (PHN 13.241) Audio compression
(D5) "A digital decimating filter for analog-to-digital conversion of hi-fi audio signals", by J. J. van der Kam in Philips Techn. Rev. 42, no. 6/7, April 1986, pp. 230-8
(D6) "A higher order topology for interpolative modulators for oversampling A/D converters", by Kirk C. H. Chao et al in IEEE Trans. on Circuits and Systems, Vol 37, no. 3, March 1990, pp. 309-18.

The above references are hereby incorporated in whole by reference.

SUMMARY OF THE INVENTION

It is an object of the invention to allow the audio management system to discriminate between the various formats, and to navigate among the various items of only a single format, so that it will not be necessary to change an actual decoder strategy.

The invention also relates to a unitary storage medium produced by the method, and to a reader or player arranged for interfacing with such storage medium. One or more of the audio formats could effectively be a dummy, but for reasons of standardizing, the multilevel TOC arrangement also needs to be changed.

BRIEF DESCRIPTION OF THE DRAWINGS

These and further aspects and advantages of the invention will be discussed more in detail hereinafter with reference to the disclosure of preferred embodiments, and in particular with reference to the appended Figures that show:

FIG. 7 shows Table 1 which specifies a Master_TOC Syntax;
FIG. 8 shows Table 2 which specifies a Master_TOC_O Syntax;
FIG. 9 shows Table 3 which specifies a Disc_Info Syntax.

DETAILED DESCRIPTION OF THE PREFERRED EMBODIMENT

Figure 1A:
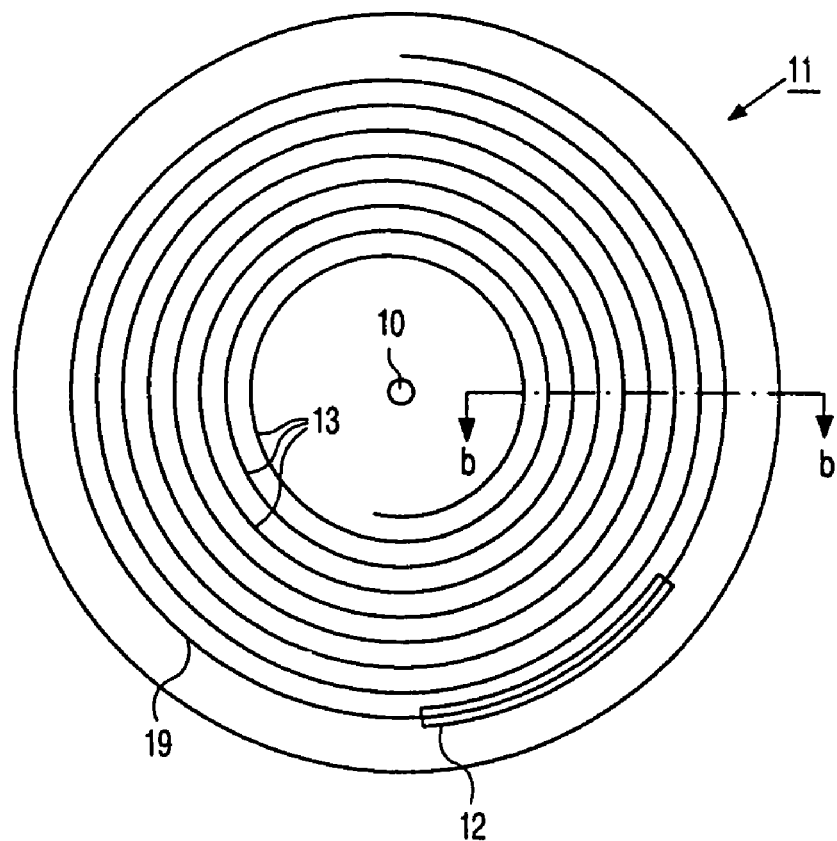
FIGS. 1a, 1b a record carrier,
FIG. 2 a play back device,
FIG. 3 a recording device,
FIG. 4, a file system for use with the invention.

FIG. 1a shows a disc-shaped record carrier 11 with track 19 and central hole 10. Track 19 is arranged in a spiral pattern of turns forming substantially parallel tracks on an information layer. The carrier may be an optical disc with a recordable or a prerecorded information layer. Examples of a recordable disc are CD-R, CD-RW, and DVD-RAM, whereas audio CD is a prerecorded disc. Prerecorded discs can be manufactured by first recording a master disc and later pressing consumer discs. Track 19 on the recordable record carrier is indicated by a providing a pre-embossed track structure during manufacture of the blank record carrier. The track may be configured as a pregroove 14 to enable a read/write head to follow the track 19 during scanning. The information is recorded on the information layer by optically detectable marks along the track, e.g. pits and lands.

Figure 1B:
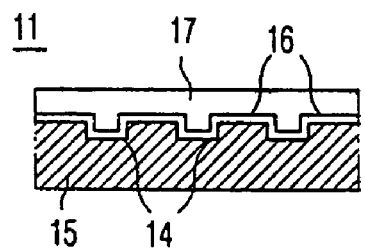

FIG. 1b is a cross-section along the line b-b of a recordable record carrier 11, wherein transparent substrate 15 carries recording layer 16 and protective layer 17. The pregroove 14 may be implemented as an indentation, an elevation, or as a material property deviating from its surroundings.

For user convenience, the audio information on the record carrier has been subdivided into items, which usually have a duration of a few minutes e.g. songs on an album or movements of a symphony. Usually the record carrier also contains access information for identifying the items, such as in a so-called Table Of Contents (TOC), or included in a file system like ISO 9660 for CD-ROM. The access information may include playing time and start address for each item, and also further information like a song title.

The audio information is recorded in digital representation after analog to digital (A/D) conversion. Examples of A/D conversion are PCM 16-bit per sample at 44.1 kHz known from CD audio and 1 bit Sigma Delta modulation at a high oversampling rate e.g. 64×Fs called bitstream. The latter method represents a high quality encoding method, with a choice between high quality decoding and low quality decoding, the latter allowing a simpler decoding circuit. Reference is made in this respect to documents D5 and D6 infra. After A/D conversion, digital audio is compressed to variable bitrate audio data for recording on the information layer. The compressed audio data is read from the record carrier at such a speed, that after decompression substantially the original timescale will be restored when reproducing the audio information continuously. Hence the compressed data must be retrieved from the record carrier at a speed dependent on the varying bitrate. The data is retrieved from the record carrier at so-called transfer speed, i.e. the speed of transferring data bytes from the record carrier to a de-compressor. The record carrier may have uniform spatial data density, which gives the highest data storage capacity per unit of area. In such system the transfer speed is proportional to the relative linear speed between the medium and the read/write head. If before the de-compressor a buffer has been provided, actual transfer speed is the speed before that buffer.

Figure 2:
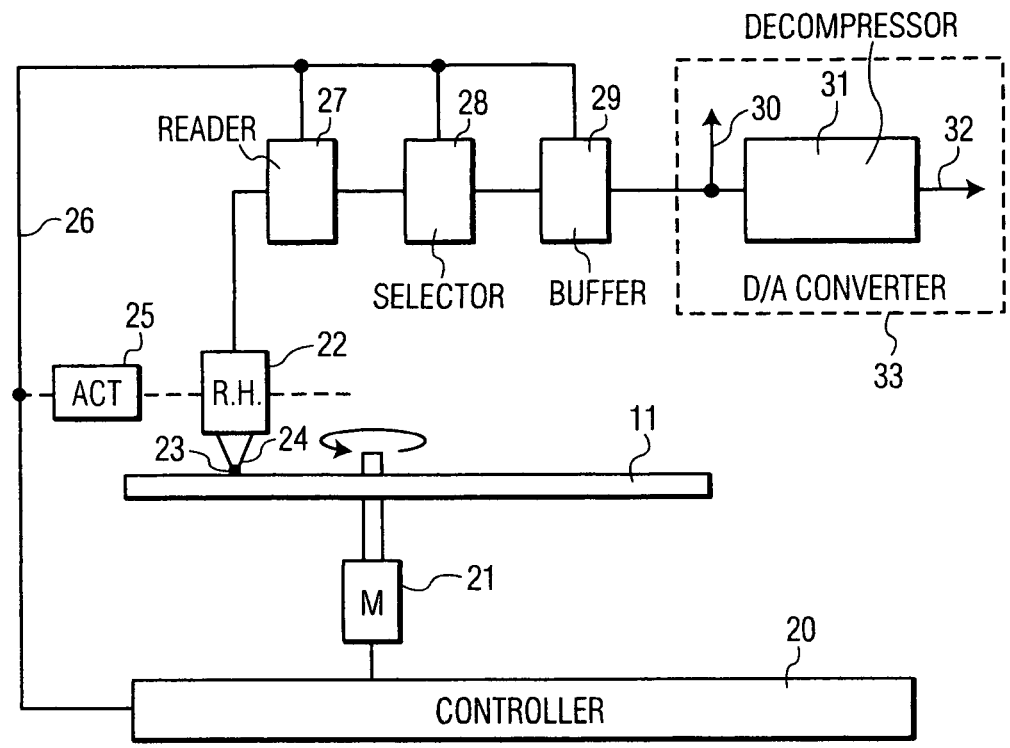

FIG. 2 shows a playback apparatus according to the invention for reading a record carrier 11 of the type shown in FIG. 1. The device has drive means 21 for rotating record carrier 11 and a read head 22 for scanning the record carrier track. Positioning means effect 25 coarse radial positioning of read head 22. The read head comprises a known optical system with a radiation source for generating a beam 24 that is guided through optical elements and focused to spot 23 on an information layer track. The read head further comprises a focusing actuator for moving the focus of the radiation 24 along the optical axis of the beam and a tracking actuator for fine positioning of spot 23 in a radial direction on the centre of the track. The tracking actuator may comprise coils for moving an optical element or may be arranged for changing the angle of a reflecting element. The radiation reflected by the information layer is detected by a known detector in the read head 22, e.g. a four-quadrant diode, to generate a read signal and further detector signals including a tracking error and focusing error signals for the tracking and focusing actuators, respectively. The read signal is processed by a reading means 27 to retrieve the data, which reading means are of a usual type for example comprising a channel decoder and an error corrector. The retrieved data is passed to a data selection means 28, to select the compressed audio data for passing on to buffer 29. The selection is based on data type indicators also recorded on the record carrier, e.g. headers in a framed format. From buffer 29, the compressed audio data are passed on to de-compressor 31 as signal 30. This signal may also be outputted to an external de-compressor. De-compressor 31 decodes the compressed audio data to reproduce the original audio information on output 32. The de-compressor may be fitted in a stand-alone high quality audio D/A convertor 33. Alternatively, the buffer may be positioned before the data selections means. The buffer 29 may be positioned in a separate housing or may be combined with a buffer in the decompressor. The device furthermore has a control unit 20 for receiving control commands from a user or from a host computer not shown, that via control lines 26 such as a system bus is connected to drive means 21, positioning means 25, reading means 27 and data selection means 28, and possibly also to buffer 29 for buffer filling level control. To this end, the control unit 20 may comprise control circuitry, such as a microprocessor, a program memory and control gates, for performing the procedures described below. Control unit 20 may be implemented as a logic circuit state machine.

The art of audio compression and de-compression is known. Audio may be compressed after digitizing by analyzing the correlation in the signal, and producing parameters for fragments of a specified size. During de-compression the inverse process reconstructs the original signal. If the original digitized signal is reconstructed exactly, the (de-)compression is lossless, whereas lossy (de)-compression will not reproduce certain details of the original signal which however are substantially undetectable by the human ear or eye. Most known systems for audio and video, such as DCC or MPEG, use lossy compression, whereas lossless compression is used for storing computer data. Examples of audio compression and decompression can be found in D2, D3 and D4 hereinafter, of which in particular the lossless compression from D2 is suitable for high quality audio.

According to the invention, data selection means 28 are arranged to retrieve from the read data certain control information. The data selection means 28 are also arranged to discard any stuffing data, that had been added during recording. When the control unit 20 is commanded to reproduce an item of audio from the record carrier, the positioning means 25 are controlled to position the reading head on the portion of the track containing the TOC. The starting address for that item will then be retrieved from the TOC via the data selection means 28. Alternatively the contents of the TOC may be read only once and stored in a memory when the disc is inserted in the apparatus. For reproducing the item the drive means 21 are controlled to rotate the record carrier at an appropriate rotary velocity, to be derived from timing indications stored with the audio. The radial position of the item can be calculated as based on the starting address, because the record carrier density parameters like track pitch and bit length, are predetermined and known to the playback device, usually from a standard. Subsequently the rotation rate can be derived from the bitrate and the radial position.

To provide continuous reproduction without buffer underflow or overflow the transfer speed is coupled to the reproduction speed of the D/A converter, i.e. to the bitrate after decompression. To this end the apparatus may comprise a reference frequency source for controlling the decompressor and the rotation rate may be set in dependence on the reference frequency and the speed profile. Alternatively or additionally the rotation rate may be adjusted using the average filling level of buffer 29, e.g. decreasing the rotation rate when the buffer is more than 50% full on average.

Figure 3:
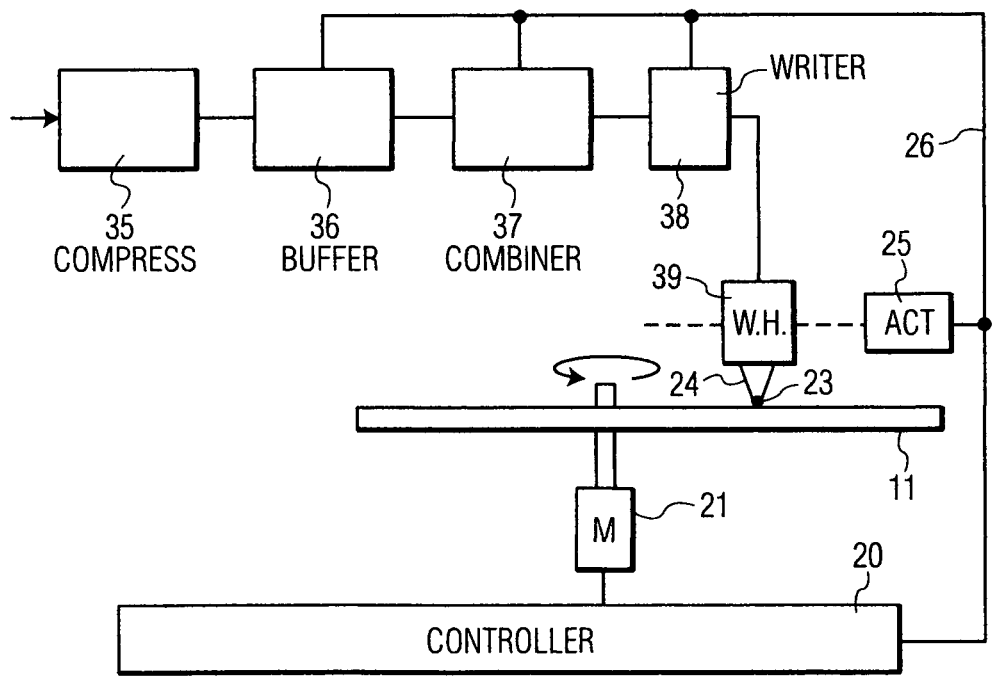

FIG. 3 shows a recording device according to the invention for writing information on a (re)writable record carrier 11. During a writing operation, marks representing the information are formed on the record carrier. The marks may be in any optically readable form, e.g. in the form of areas whose reflection coefficient differs from their surroundings, by recording in materials such as dye, alloy or phase change, or in the form of areas with a direction of magnetization different from their surroundings when recording in magneto-optical material. Writing and reading of information for recording on optical disks and usable rules for formatting, error correcting and channel coding, are well-known, e.g. from the CD system. Marks may be formed through a spot 23 generated on the recording layer via a beam 24 of electromagnetic radiation, usually from a laser diode. The recording device comprises similar basic elements as described with reference to FIG. 2, i.e. a control unit 20, drive means 21 and positioning means 25, but it has a distinctive write head 39. Audio information is presented on the input of compression means 35, which may be placed in a separate housing. Suitable compression has been described in D2, D3 and D4. The variable bitrate compressed audio on the output of the compression means 35 is passed to buffer 36. From buffer 36 the data is passed to data combination means 37 for adding stuffing data and further control data. The total data stream is passed to writing means 38 for recording. Write head 39 is coupled to the writing means 38, which comprise for example a formatter, an error encoder and a channel encoder. The data presented to the input of writing means 38 is distributed over logical and physical sectors according to formatting and encoding rules and converted into a write signal for the write head 39. Unit 20 is arranged for controlling buffer 36, data combination means 37 and writing means 38 via control lines 26 and for performing the positioning procedure as described above for the reading apparatus. Alternatively the recording apparatus may be arranged for reading having the features of the playback apparatus and a combined write/read head.

Figure 4:
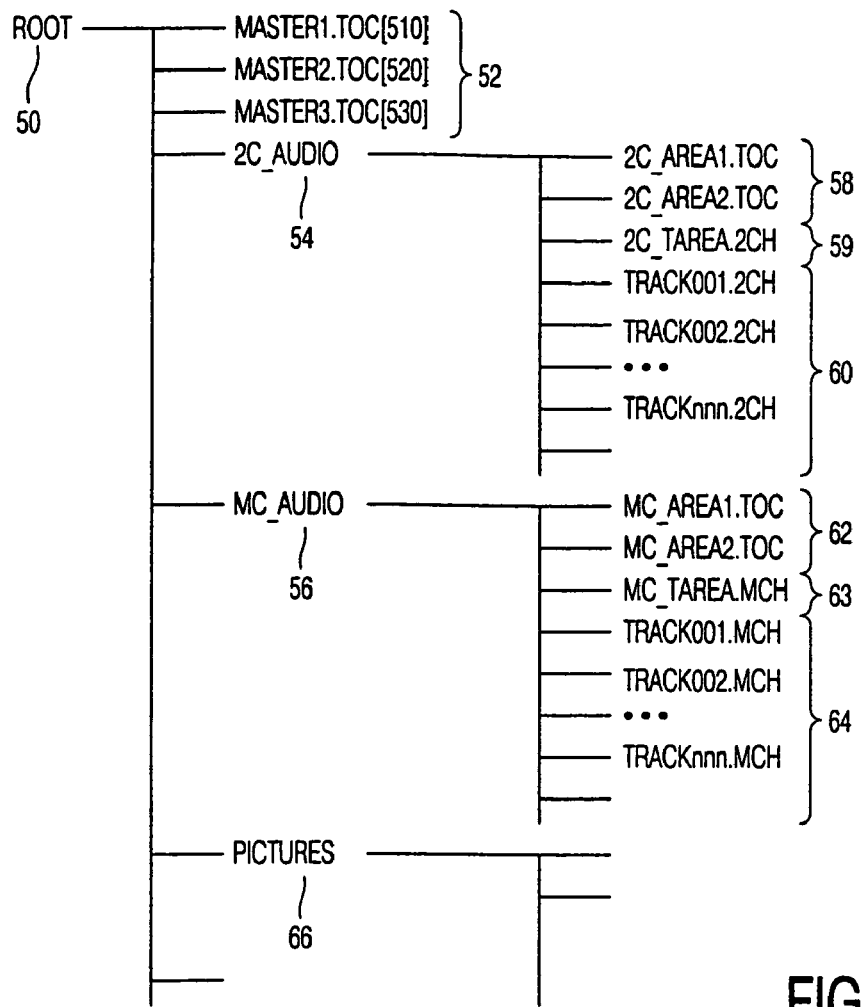

FIG. 4 shows a file system for use with the invention, for which various different options are feasible. As main choices the inventors have proposed that the storage medium should be based on either the UDF file system or the ISO 9660 file system, or both, which systems are standard to the skilled art person. In the alternative case, no file system would be present at all and the relevant sector spaces should be kept empty.

If a file system is present however, all audio will be stored in Audio Files, that are located in SubDirectory SCD_AUDIO. As shown in FIG. 4, the hierarchy is based on ROOT file 50 that points to various subaltern files 52, 54, 56, 66 as shown. The structure of MASTER.TOC 52 will be discussed hereinafter. Furthermore, there is a 2C_AUDIO file 54. This points to TOC 2C_AREA.TOC 58 and in parallel therewith to the various stereo tracks TRACKn.2CH 60. Furthermore, there is MC_AUDIO file 56. This points to TOC MC_AREA.TOC 62 and in parallel therewith to the various stereo tracks TRACKn.MCH 64. For reasons of safety, the MASTER.TOC has been provided in three contiguously positioned copies MASTER1..3.TOC52. Likewise for reasons of safety, the subaltern TOCs have been provided in two copies 2C_AREA1,2.TOC 58 and MC_AREA1,2.TOC.62, respectively. These two copies are positioned before and behind, respectively, the associated audio. As a further feature, the audio formats have an additional overall file each, 2C_TAREA.2CH 59 and MC_TAREA.MCH that contain the file information of all associated track files, respectively. Finally, a picture file 66 has been provided that may be related to a similar organization as has been provided for the audio.

Figure 5:
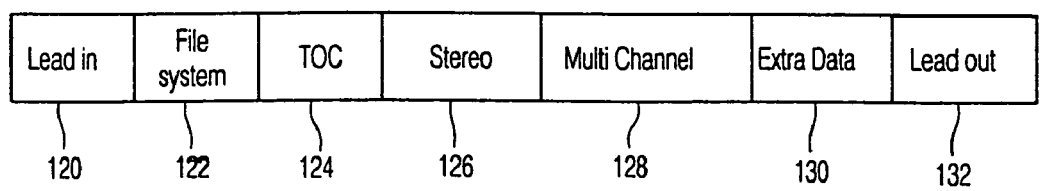
FIG. 5, a first storage arrangement for the invention.

FIG. 5 shows a first storage arrangement for use with the invention, which for example has been mapped on a single serial track. Along the horizontal axis the following items are evident. Item 120 is a Lead-in area that is used for mutually synchronizing the reader and the driving of the medium. Item 122 represents the File System that has been disclosed with reference to FIG. 4. Item 124 represents a TOC that may be configured according to standard procedures and pertains to subsequent items Stereo Audio Item 126 and Multi-channel Audio Item 128, and if necessary also to Extra Data Item 130. The length of item 124 need not be standardized, inasmuch as various different amounts of information may be present. Item 126 represents Stereo Audio Information, that may be defined according to a conventional standard and by itself does not constitute part of the invention. Item 128 represents Multi Channel Audio Information, that may be defined according to a conventional standard and by itself does not constitute part of the invention. Generally, the two audio areas may have the same structure and contain the same kinds of information, apart from the distinguishing definitions of the various channels. The audio may be plain coded or lossless coded. All kinds of audio may be multiplexed with supplementary data such as Compact Disc Text.

Item 130 represents Extra Data Information that may be defined in a conventional standard and by itself does not form part of the invention. Item 132 represents a Lead-Out Information. The latter item is used in particular during search operations. The number of lead-out tracks may be large enough to cover a ring of some 0.5 to 1 millimeter wide. According to the above, the stored information may either be accessed via the file system as laid down in item 122, or via the TOC structure laid down in item 124, and more particular, via a two- or multi-level TOC structure.

Figure 6:
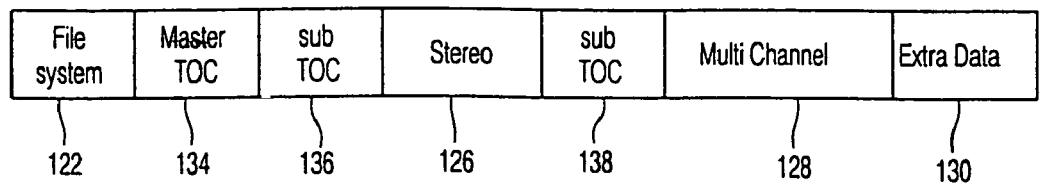
FIG. 6, a second storage arrangement for the invention.

FIG. 6 shows a second storage arrangement for use with the invention, pertaining to a two-level TOC structure. Along the horizontal axis the following items are evident, next to items that have already been shown in FIG. 5 and carry the same reference numerals. For clarity, items 120 and 132 have been suppressed.

Master TOC 134 begins at a uniformly standardized offset position with respect to the start of the Lead-in area at byte number 510. According to the embodiment, the Master-TOC measures only one standard-size sector and primarily contains pointers to the various Sub-TOCs or Area-TOCs. A preferred syntax of the Master-TOC has a header with a Signature that identifies the Master-TOC, such as by "SACD Master TOC". Further, Tables 1 and 2 specify the precise syntax of the MASTER_TOC. The syntax has been given in elementary computer notation, together with the associated lengths and formats. Master_TOC_Signature is an 8 byte string identifying the Master TOC. The value of Master_TOC_Signature must be "SACDMTOC" ($53 $41 $43 $44 $4D $54 $4F $43).

Likewise Table 3 specifies the disc info syntax in the same manner. In particular:

2CH_TOC_1_Address is a 5 byte integer containing the logical sector number (LSN) of the first sector of Area TOC-1 in the 2 Channel Stereo Area. If the 2-Channel Stereo Area is not present, the value of 2CH_TOC_1_Address must be zero. 2CH-TOC_2_Address is a 4 byte integer containing the LSN of the first sector of Area TOC-2 in the 2 Channel Stereo Area. if the 2-Channel Stereo Area is not present, the value of 2CH_TOC_2_Address must be zero.

MC_TOC_1_Address is a 4 byte integer containing the LSN of the first sector of Area TOC-1 in the Multi Channel Stereo Area. If the Multi Channel Area is not present, the value of MC_TOC_1_Address must be zero.

MC_TOC_2_Address is a 4 byte integer containing the LSN of the first sector of Area TOC-2 in the Multi Channel Stereo Area. If the Multi Channel Area is not present, the value of MC_TOC_2_Address must be zero.

The format of Disc_Flags must be as follows: a hybrid bit and seven reserved bits.

The Hybr bit must be set to one on a Hybrid Disc. The Hybr bit must be set to zero on a not-Hybrid Disc.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

What is claimed is:

1. A method for storing audio-centered information on a unitary storage medium while using a table-of-contents (TOC) mechanism for therein specifying an actual configuration of various audio items on the medium, comprising:

assigning one or more sub-TOCs to each of a plurality of differently standardized audio formats, the sub-TOCs for specifying an actual configuration of various audio items on the medium, the different audio formats including a first format of a first standard and second format of a second standard and providing a single master-TOC with pointing information specifically pointing to each of the sub-TOCs; and wherein, some players conforming to the first standard for playing audio information stored in the format of the first standard being unable to play information stored in the format of a second standard and some players conforming to the second standard for playing audio information stored in the format of the second standard being unable to play information stored in the format of the first standard.

2. The method of claim 1, wherein the number of sub-TOCs is exactly 2.

3. The method of claim 1, and furthermore providing the master-TOC at a standard offset location with respect to an initial location of the medium.

4. The method of claim 1, wherein the audio formats include at least a stereo format and at least one multi-channel audio format, the multi-channel format including 5 or 6 channels.

5. The method of claim 1, and furthermore providing at least one extra data format area for data in addition to audio items.

6. The method of claim 1, and furthermore providing a plurality of copies of the master-TOC and sub-TOCs.

7. The method of claim 1 wherein the actual configuration of the various audio items include a description of the audio items and a location where each item is stored on the medium.

8. The method of claim 1 wherein the audio items include musical portions that are several minutes long.

9. The method of claim 1 further comprising providing a file system with a root directory with a file containing the master-TOC and a subdirectory for each different standard audio format, the subdirectories having one or more sub-TOCs and one or more audio files for the standard audio format, one or more audio files each contain multiple audio items.

10. The method of claim 1 further comprising storing audio items on the medium and updating the master-TOC and sub-TOCs depending on the stored audio items.

11. The method of claim 1 wherein one of the standard formats includes lossy compressed audio items.

12. The method of claim 1 wherein one of the standard formats includes lossless compressed audio items.

13. The method of claim 1 wherein each Sub-TOC is stored contiguous with the respective audio information which it describes.

14. A unitary storage medium produced by the method of claim 1.

15. The medium of claim 14 wherein the medium is an optically readable disc.

16. A reading device for reading audio-centered information using a Table-of-Contents (TOC) mechanism for therein specifying an actual configuration of various audio items on a medium, comprising:
means for controlling the reading of pointing information from a single master-TOC, the pointing information specifically pointing to each of the sub-TOCs,
means for determining the position of one or more sub-TOCs for each of a plurality of differently standardized audio formats, the determination depending on the pointer information, the different audio formats including a first format of a first standard and second format of a second standard and
means for controlling the reading of the actual configuration of the various audio items from the one or more sub-TOCs for at least one of the standard formats; and wherein,
some players conforming to the first standard for playing audio information stored in the format of the first standard being unable to play information stored in the format of a second standard and some players conforming to the second standard for playing audio information stored in the format of the second standard being unable to play information stored in the format of the first standard.

17. The reading device of claim 16, further comprising disc hold means, optical read means, and disc drive means for driving a disc track along the optical read means.

18. The reading device of claim 16 wherein each Sub-TOC is stored contiguous with the respective audio information which it describes.

19. A method, comprising: providing one or more sub-TOCs for each of a plurality of differently standardized audio formats, the sub-TOCs specifying an actual configuration of various audio items on a medium, the different audio formats including a first format of a first standard and second format of a second standard; and providing a single master-TOC for specifically pointing to each of the sub-TOCs; and wherein, some players conforming to the first standard for playing audio information stored in the format of the first standard being unable to play information stored in the format of a second standard and some players conforming to the second standard for playing audio information stored in the format of the second standard being unable to play information stored in the format of the first standard.

20. A unitary medium, comprising: one or more sub-TOCs for each of a plurality of different standardized audio formats, the sub-TOCs specifying an actual configuration of various audio items stored on the medium, the different audio formats including a first format of a first standard and second format of a second standard; and a single master-TOC for specifically pointing to each of the sub-TOCs; and wherein, some players conforming to the first standard for playing audio information stored in the format of the first standard being unable to play information stored in the format of a second standard and some players conforming to the second standard for playing audio information stored in the format of the second standard being unable to play information stored in the format of the first standard.

21. A reader device comprising:
means for controlling the reading from sub-TOCs from a medium, one or more sub-TOCs being provided for each of a plurality of differently standardized audio formats stored on the medium, the sub-TOCs specifying an actual configuration of various audio items stored on the medium, the different audio formats including a first format of a first standard and second format of a second standard; and
means for controlling the reading of pointer information from a master-TOC stored on the medium, and determining the position of the one or more sub-TOCs for a standardized audio format depending on the pointer information, there being only a single master-TOC on the medium; and wherein,
some players conforming to the first standard for playing audio information stored in the format of the first standard being unable to play information stored in the format of a second standard and some players conforming to the second standard for playing audio information stored in the format of the second standard being unable to play information stored in the format of the first standard.

22. The reading device of claim 21 wherein each Sub-TOC is stored contiguous with the respective audio information which it describes.

* * * * *